United States Patent
Sung (10) Patent No.: US 12,062,749 B2
(45) Date of Patent: Aug. 13, 2024

(54) GUIDE HOPPER AND APPARATUS FOR MANUFACTURING SECONDARY BATTERY INCLUDING THE SAME

(71) Applicant: LG Energy Solution, Ltd., Seoul (KR)

(72) Inventor: Dae Hwan Sung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 45 days.

(21) Appl. No.: 17/939,652

(22) Filed: Sep. 7, 2022

(65) Prior Publication Data

US 2023/0084862 A1 Mar. 16, 2023

(30) Foreign Application Priority Data

Aug. 30, 2021 (KR) ........................ 10-2021-0115109

(51) Int. Cl.
*H01M 10/04* (2006.01)
*B65G 59/06* (2006.01)

(52) U.S. Cl.
CPC ...... *H01M 10/0404* (2013.01); *B65G 59/061* (2013.01)

(58) Field of Classification Search
CPC . H01M 10/0404; B65G 59/061; B65G 47/44; B65B 39/02; B65H 31/38; B65H 31/34
USPC .... 193/33, 34, 2 C; 271/207, 217, 224, 221; 414/791.2, 791.6, 792, 792.3; 53/255, 53/257, 260
See application file for complete search history.

(56) References Cited

U.S. PATENT DOCUMENTS

| | | | | |
|---|---|---|---|---|
| 814,522 A | * | 3/1906 | Dexter et al. .......... | B65H 31/10 271/217 |
| 1,700,990 A | * | 2/1929 | Sullivan ................. | B65H 31/00 271/223 |
| 2,393,254 A | * | 1/1946 | Leifer .................... | B65H 31/10 271/221 |
| 2,626,801 A | * | 1/1953 | Uriell ..................... | B41F 23/00 271/211 |
| 3,122,242 A | * | 2/1964 | Lopez .................... | B65B 57/20 414/788.9 |
| 3,737,051 A | * | 6/1973 | Horino ................... | B65H 31/38 414/788 |
| 3,822,795 A | * | 7/1974 | Salsburg ................ | B65G 57/00 271/221 |

(Continued)

FOREIGN PATENT DOCUMENTS

| | | |
|---|---|---|
| JP | 2006339118 A | 12/2006 |
| JP | 2014094834 A | 5/2014 |

(Continued)

*Primary Examiner* — Gregory W Adams
(74) *Attorney, Agent, or Firm* — Lerner David LLP (57) ABSTRACT

Provided are a guide hopper and an apparatus for manufacturing secondary battery including the same. The guide hopper includes a guide space adjusted by movement of a corner member defining the guide space. The guide hopper includes a housing, in which an inner space having upper and lower portions is defined, and a variable assembly disposed in the inner space of the housing. The variable assembly includes four corner members of which bent inner sides define a guide space having a rectangular shape. The size of the guide space is adjustable by movement of the corner members in a first direction or in a second direction perpendicular to the first direction.

18 Claims, 9 Drawing Sheets

(56) References Cited

U.S. PATENT DOCUMENTS

| | | | | |
|---|---|---|---|---|
| 4,072,304 | A * | 2/1978 | Brown | B65H 3/446 |
| | | | | 270/52.04 |
| 5,195,305 | A * | 3/1993 | Dambrosio | B65B 39/007 |
| | | | | 53/260 |
| 5,441,381 | A * | 8/1995 | Boix Jaen | B65G 57/302 |
| | | | | 414/795.3 |
| 8,490,972 | B1 * | 7/2013 | Dickinson | A63F 1/12 |
| | | | | 273/149 R |
| 8,585,037 | B1 | 11/2013 | Jacobs | |
| 2004/0154160 | A1 | 8/2004 | Hong | |
| 2021/0098817 | A1 | 4/2021 | Lee | |

FOREIGN PATENT DOCUMENTS

| | | | |
|---|---|---|---|
| KR | 20020089716 | A | 11/2002 |
| KR | 20030071916 | A | 9/2003 |
| KR | 101959082 | B1 | 3/2019 |
| KR | 102101831 | B1 | 4/2020 |
| KR | 102152563 | B1 | 9/2020 |

* cited by examiner

FIG. 1

PRIOR ART

GUIDE HOPPER AND APPARATUS FOR MANUFACTURING SECONDARY BATTERY INCLUDING THE SAME

CROSS-REFERENCE TO RELATED APPLICATIONS

This application claims the priority of Korean Patent Application No. 10-2021-0115109 filed on Aug. 30, 2021, in the Korean Intellectual Property Office, the disclosure of which is incorporated herein by reference.

BACKGROUND OF THE INVENTION

Field of the Invention

The present invention relates to a guide hopper and an apparatus for manufacturing a secondary battery including the same, and more particularly, to a guide hopper, in which the size of a guide space is adjusted by movement of a corner member defining the guide space so that when a full-length or full-width of a radical unit changes, non-operating losses due to replacement of the guide hopper is reduced, and an apparatus for manufacturing a secondary battery including the guide hopper.

Description of the Related Art

A secondary battery has a structure in which an electrode assembly and an electrolyte are embedded in a case such as a can or a pouch. The electrode assembly has a structure in which a positive electrode, a separator, and a negative electrode are repeatedly stacked, and representative examples thereof include a jelly-roll (wound)-type electrode assembly having a structure in which elongated sheet-shaped positive and negative electrodes are wound with a separator interposed therebetween, a stacked type electrode assembly in which multiple positive and negative electrodes are cut into units, each of which has a predetermined size, and stacked in sequence with a separator interposed therebetween, a laminated and stacked-type electrode assembly, and so on.

In a process for manufacturing the electrode assembly according to a lamination and stacking method, electrodes cut are disposed at predetermined intervals on one or more separators sequentially supplied. Thereafter, in order to increase adhesion between the electrodes and separators, the combined electrodes and separators are heated and rolled while passing between a pair of rollers in a state in which the electrodes are stacked on the separators (a state in which unit cells or radical units are spaced a gap from each other), so that the electrodes and the separators are bonded by heat and pressure. Thereafter, the stacked electrodes and separators are cut into radical units, and the cut radical units are transferred and stacked to form the electrode assembly.

Figure 1:
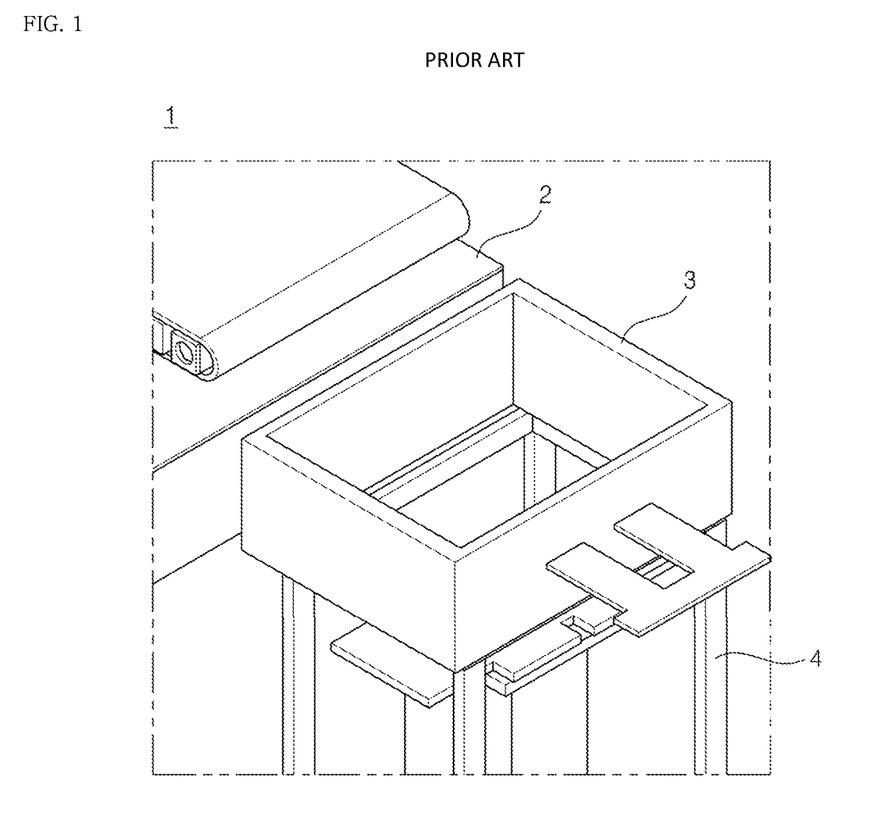
FIG. 1 is a perspective view illustrating an apparatus for manufacturing a secondary battery according to the related art.

FIG. 1 illustrates an apparatus 1 for manufacturing a secondary battery according to the related art. Referring to FIG. 1, in the apparatus 1 and process for manufacturing a secondary battery in which in radical units are stacked, the cut radical units are transferred through a transfer part 2 such as a conveyor belt, and dropped and loaded into a magazine 4 disposed below the transfer part 2. A hopper 3 is provided above a magazine 4 to define a guide space, and induces the radical units to be dropped into the guide space so that the radical units may be prevented from being separated to the outside of the apparatus and may be dropped and loaded into the magazine 4 in an aligned state.

In the related art, however, the hopper 3 or the guide space inside the hopper 3 is manufactured as a size-fixed type and thus, when the size of the radical units changes due to a change in, for example, a model of the radical units, it is required to newly manufacture and install a hopper corresponding to the changed size. Accordingly, in the related art, continuing costs for manufacturing and replacing the hopper 3 occur, and furthermore, when an operation of a line is stopped for replacement work, various types of non-operating losses occur to deteriorate process and cost efficiency.

SUMMARY OF THE INVENTION

An aspect of the present invention provides a guide hopper, in which the size of a guide space is adjusted by movement of a corner member defining the guide space so that even when a full-length or full-width of a radical unit changes, non-operating losses due to replacement of the guide hopper is reduced and process and cost efficiency is enhanced, and an apparatus for manufacturing a secondary battery including the guide hopper.

According to an aspect of the present invention, there is provided a guide hopper including a housing, in which an inner space having upper and lower portions opened is defined, and a variable assembly disposed in the inner space of the housing. The variable assembly includes four corner members of which bent inner sides define a guide space having a rectangular parallelepiped shape. The size of the guide space is adjustable by movement of the corner members in a first direction or in a second direction perpendicular to the first direction.

The housing may have four side surfaces along which side frames are connected to each other to define the inner space.

The variable assembly may further include a pair of full-length adjustment frames, each of which has a length in the first direction and which are provided to be parallel to each other. The corner members may be provided on the full-length adjustment frames so as to be disposed in the inner space defined by the pair of full-length adjustment frames.

The full-length adjustment frame may have a shape in which one end in a longitudinal direction is bent downward.

The corner members may include a pair of first corner members, each of which is provided at one side in a longitudinal direction of the pair of full-length adjustment frames, and a pair of second corner members, each of which is provided at the other side in the longitudinal direction of the pair of full-length adjustment frames.

The variable assembly may further include a full-length adjustment ball screw, which passes through the full-length adjustment frame in the second direction to be coupled at one end of the full-length adjustment frame in the longitudinal direction, and a full-length adjustment lever which rotates the full-length adjustment ball screw to move the full-length adjustment frame in the second direction.

The full-length adjustment lever may include a dial display part in which a dial changing by an operation of the full-length adjustment lever is displayed.

The full-length adjustment frame may include a first full-length adjustment frame, and a second full-length adjustment frame provided to be parallel to the first full-length adjustment frame. The full-length adjustment ball screw may include a first full-length adjustment ball screw, which passes through the first full-length adjustment frame to be coupled at one end of the first full-length adjustment frame in a longitudinal direction, and a second full-length adjustment ball screw which passes through the second full-length adjustment frame to be coupled at one end of the second full-length adjustment frame in a longitudinal direction.

The full-length adjustment lever may include a first full-length adjustment lever, which is provided in a longitudinal direction of the first full-length adjustment ball screw to rotate the first full-length adjustment ball screw, and a second full-length adjustment lever which is provided in a direction perpendicular to a longitudinal direction of the second full-length adjustment ball screw to rotate the second full-length adjustment ball screw.

The variable assembly may further include a full-width adjustment frame having a length in the second direction and provided to be spaced a predetermined distance from each of the full-length adjustment frames. The first corner member may have a lower portion mounted on the full-length adjustment frame, and an upper portion mounted on the full-width adjustment frame.

The full-width adjustment frame may have a shape in which both ends in a longitudinal direction are bent downward.

The variable assembly may further include a full-width adjustment ball screw, which passes through the full-width adjustment frame in the first direction to be coupled at one end of the full-width adjustment frame in a longitudinal direction, and a full-width adjustment lever which rotates the full-width adjustment ball screw to move the full-width adjustment frame in the first direction.

The full-width adjustment lever may include a dial display part in which a dial changing by an operation of the full-width adjustment lever is displayed.

The variable assembly may further include a pair of first linear movement guides, which are provided on facing side surfaces of the pair of full-length adjustment frames and guide movement of the first corner members in the first direction, a second linear movement guide, which is provided in the housing and guides movement of the second corner members in the second direction, a pair of third linear movement guides, which are provided in the housing and guide movement of the full-width adjustment frame in the first direction, and a fourth linear movement guide which is provided on the full-width adjustment frame and guides movement of the first corner members in the second direction.

The first corner member may include a first bracket, which is mounted on the fourth linear movement guide and each of the first linear movement guides, and a first guide block provided on the first bracket. The second corner member may include a second bracket, which is mounted on the second linear movement guide and the full-length adjustment frame, and a second guide block provided on the second bracket.

The guide hopper may further include a roller provided on an upper portion at one side of the housing so as to have a length in the second direction.

The roller may be provided to be slidably attachable and detachable in the second direction.

According to another aspect of the present invention, there is provided an apparatus for manufacturing a secondary battery including a magazine, into which a radical unit is dropped and loaded, and a guide hopper which is provided above the magazine and guides the dropping of the radical unit. The guide hopper includes a housing, in which an inner space having upper and lower portions opened is defined, and a variable assembly disposed in the inner space of the housing. The variable assembly includes four corner members of which bent inner sides define a guide space having a rectangular parallelepiped shape. The size of the guide space is adjustable by movement of the corner members in a first direction or in a second direction perpendicular to the first direction.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings to enable those skilled in the art to which the present invention pertains to easily carry out the present invention. The present invention may, however, be embodied in different forms and should not be construed as limited by the embodiments set forth herein.

The parts unrelated to the description, or the detailed descriptions of related well-known art that may unnecessarily obscure subject matters of the present invention, will be ruled out in order to clearly describe the present invention. Like reference numerals refer to like elements throughout the whole specification.

Moreover, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe his or her invention in the best ways.

Embodiment 1

Figure 2:
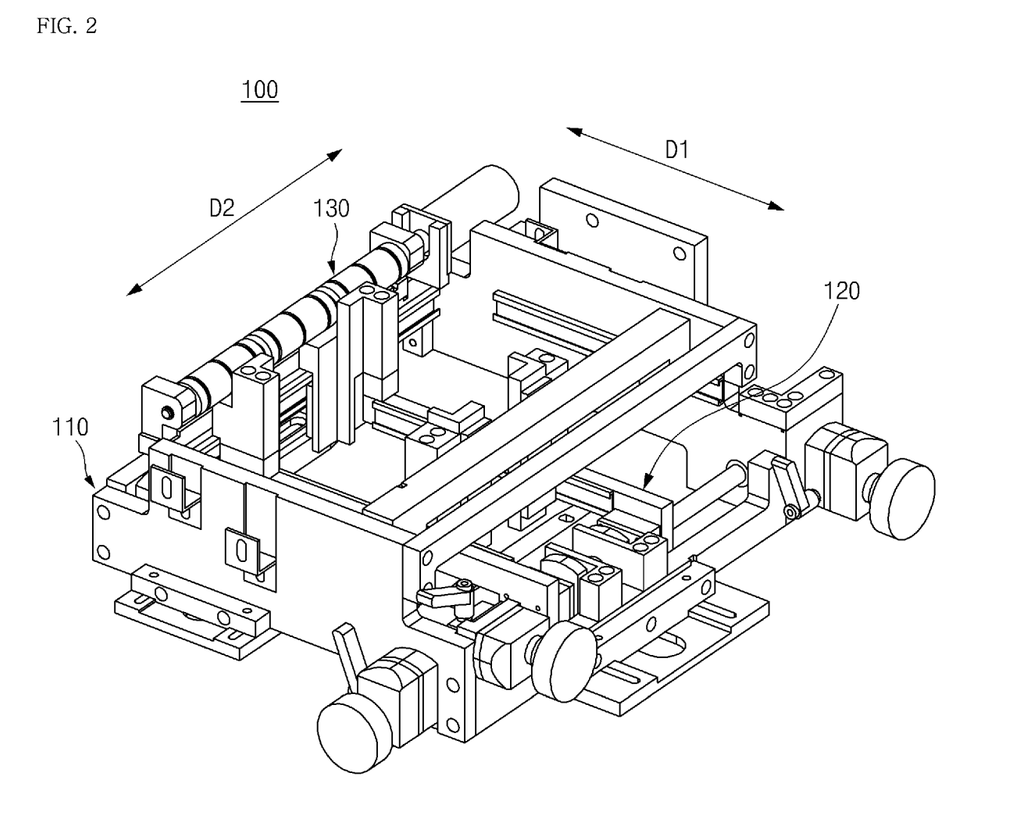
FIG. 2 is a perspective view illustrating a guide hopper according to Embodiment 1 of the present invention.
Figure 3:
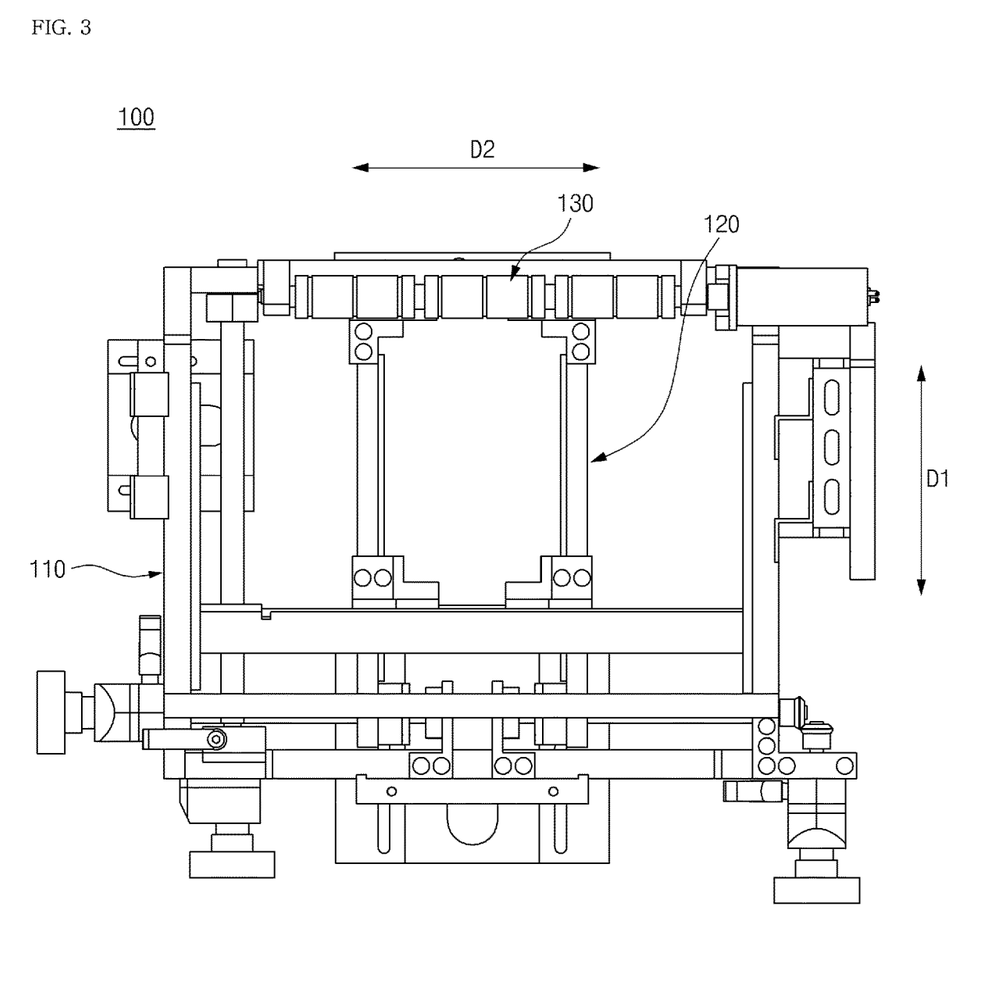
FIG. 3 is a plan view illustrating the guide hopper according to Embodiment 1 of the present invention.
Figure 4:
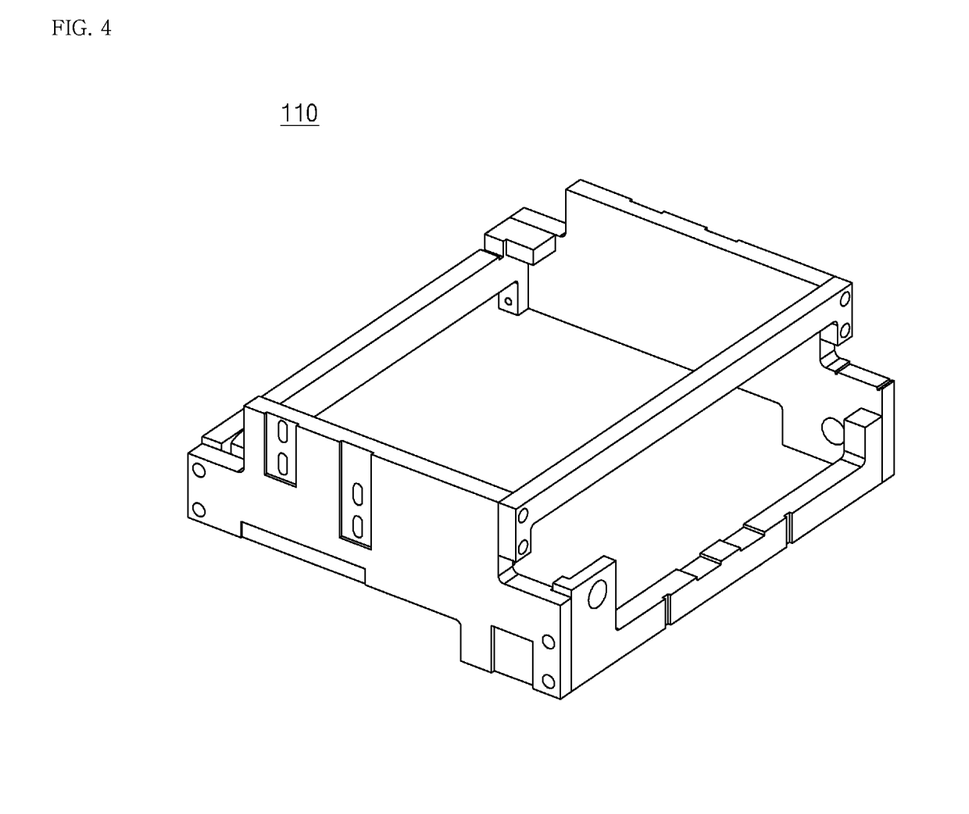
FIG. 4 is a perspective view illustrating a housing of the guide hopper according to Embodiment 1 of the present invention.

FIG. 2 is a perspective view illustrating a guide hopper 100 according to Embodiment 1 of the present invention. FIG. 3 is a plan view illustrating the guide hopper 100 according to Embodiment 1 of the present invention. FIG. 4 is a perspective view illustrating a housing 110 of the guide hopper 100 according to Embodiment 1 of the present invention.

Referring to FIGS. 2 and 3, the guide hopper 100 according to the present invention includes a housing 110 and a variable assembly 120. As illustrated in FIG. 4, an inner space having upper and lower portions opened may be defined in the housing 110, and in detail, side frames may be connected to each other along four side surfaces of the housing 110 to define the inner space. The side frames may be provided in plurality to be connected to each other but do not necessarily have the same size and shape. The side frames may have various sizes and shapes so as to fix the variable assembly 120 disposed therein and protect the variable assembly 120 from external impact, and accordingly, the proper number of side frames may be connected to each other to define the inner space. In addition, the side frames may be provided with through-holes through which a full-length adjustment lever 124, a full-width adjustment lever 127, or the like, which will be described later, are mounted.

Figure 5:
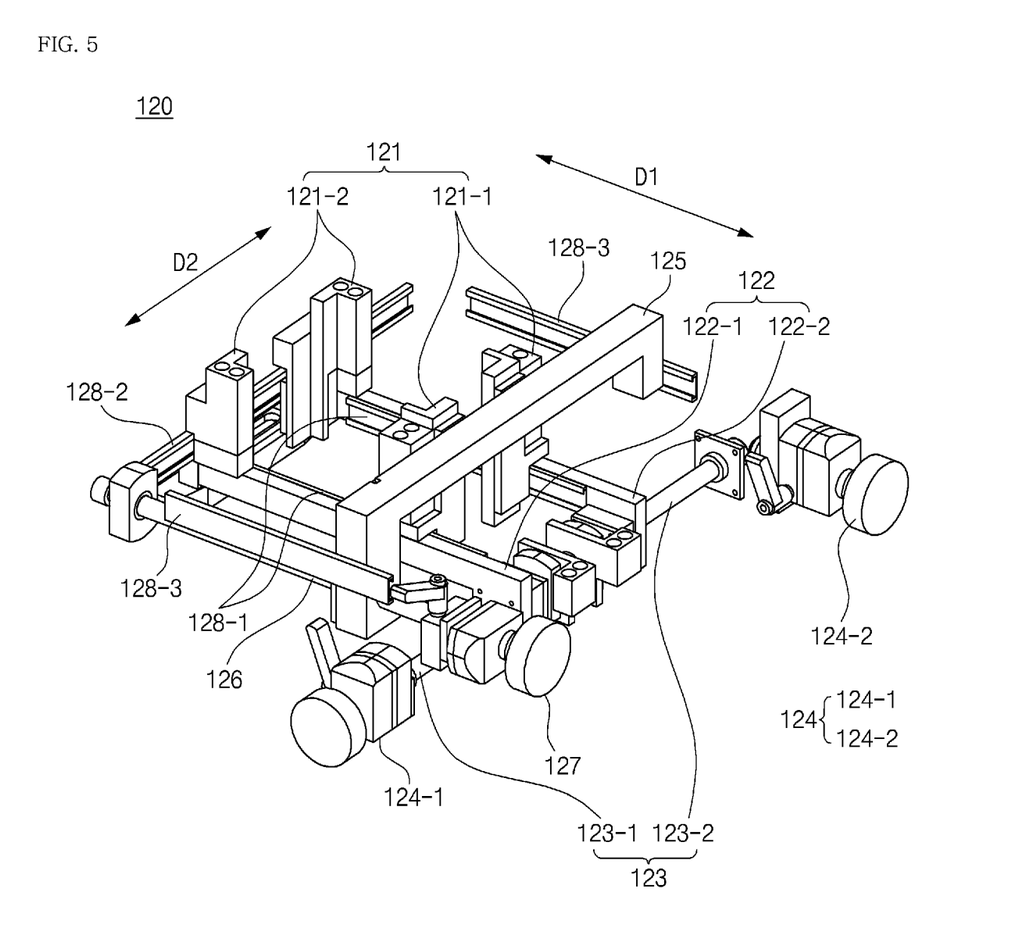
FIG. 5 is a perspective view illustrating a variable assembly of the guide hopper according to Embodiment 1 of the present invention.

FIG. 5 is a perspective view illustrating the variable assembly 120 of the guide hopper 100 according to Embodiment 1 of the present invention. Referring to FIG. 5, the variable assembly 120 is disposed in the inner space of the housing 110 and includes four corner members 121 of which bent inner sides define a guide space having a rectangular parallelepiped shape. That is, each of the corner members 121 may be bent to have a L shape when viewed from an upper side, and the bent inner sides may be provided to face each other so as to define the guide space having a rectangular parallelepiped shape.

Here, the guide space means a space defined to guide vertical drop of a radical unit having a rectangular shape and thus, an area of the guide space in a horizontal direction may be an area having a size corresponding to the radical unit.

Here, the corresponding size means that the area of the guide space in the horizontal direction is greater than the area of the radical unit by the size of an offset. If the area of the guide space in the horizontal direction is the same as the area of the radical unit, the radical unit may collide with the corner member 121 without being inserted into the guide space, and, even when inserted, may be abnormally dropped. In contrast, if the area of the guide space in the horizontal direction is excessively greater than the area of the radical unit, the radical unit may collide with the corner member 121 inside the guide space to cause cracks, and a degree of alignment may be reduced when the radical unit is dropped and loaded. Thus, the size of the offset may be determined according to the size of the radical unit and selected as such an appropriate size that the radical unit is easily inserted and dropped into the guide space and the radical unit is dropped at a predetermined position inside the guide space to be loaded with a high degree of alignment.

The guide hopper 100 according to the present invention may be provided so that the size of the guide space is adjustable by movement of the corner members 121 in a first direction D1 or in a second direction D2 perpendicular to the first direction D1. Here, the first direction D1 may mean a direction, in which the radical unit is transferred to the guide hopper 100, or a direction parallel to a direction in which the radical unit enters the guide hopper 100, and may also mean a direction parallel to the full-width that is the width of the radical unit. The second direction D2 may mean a direction perpendicular to the first direction D1 and a direction parallel to the full-length that is the length of the radical unit entering the guide hopper 100.

In the present invention, as described above, the size of the guide space may be adjusted by movement of the corner members 121 defining the guide space. Accordingly, even when the full-length or full-width of the radical unit changes due to a change in a model of the radical unit, the guide space may be adjusted to correspond to the changed size of the radical unit by appropriately moving the corner members 121 in the first direction D1 or in the second direction D2 without separately replacing the guide hopper 100. Thus, since it is not required to provide a hopper for each size of the radical units, the manufacturing costs of the apparatus may be reduced. Moreover, various kinds of non-operating losses, which may occur due to the replacement of the guide hopper 100, may be reduced to enhance the process efficiency.

Figure 6:
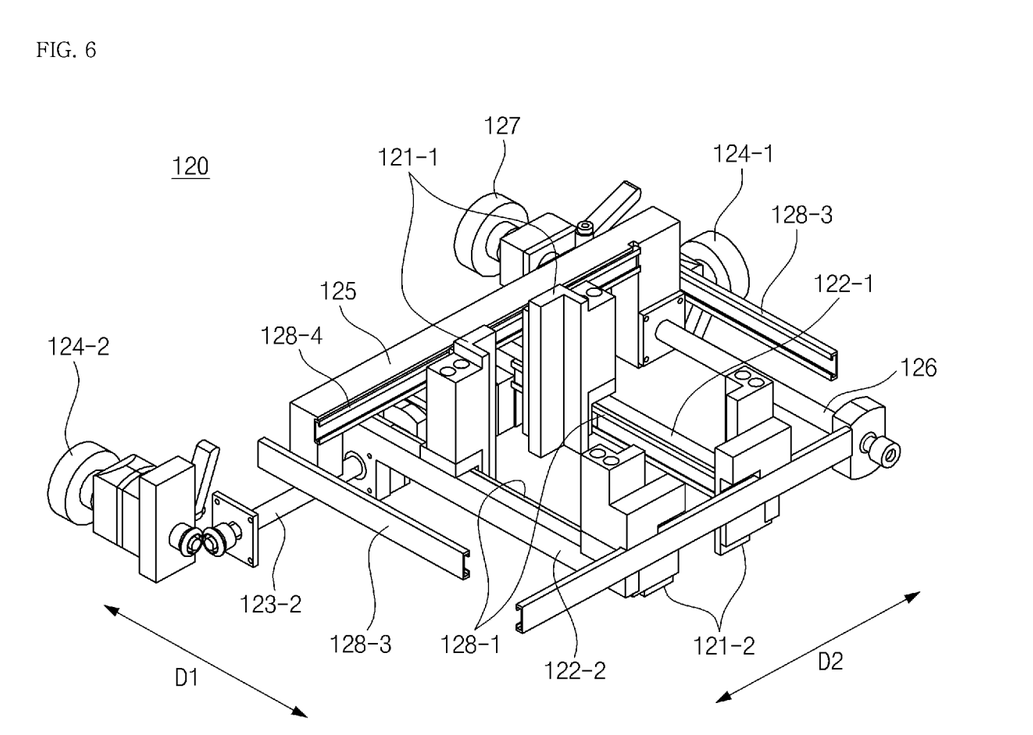
FIG. 6 is a rear perspective view illustrating the variable assembly of the guide hopper according to Embodiment 1 of the present invention.
Figure 7:
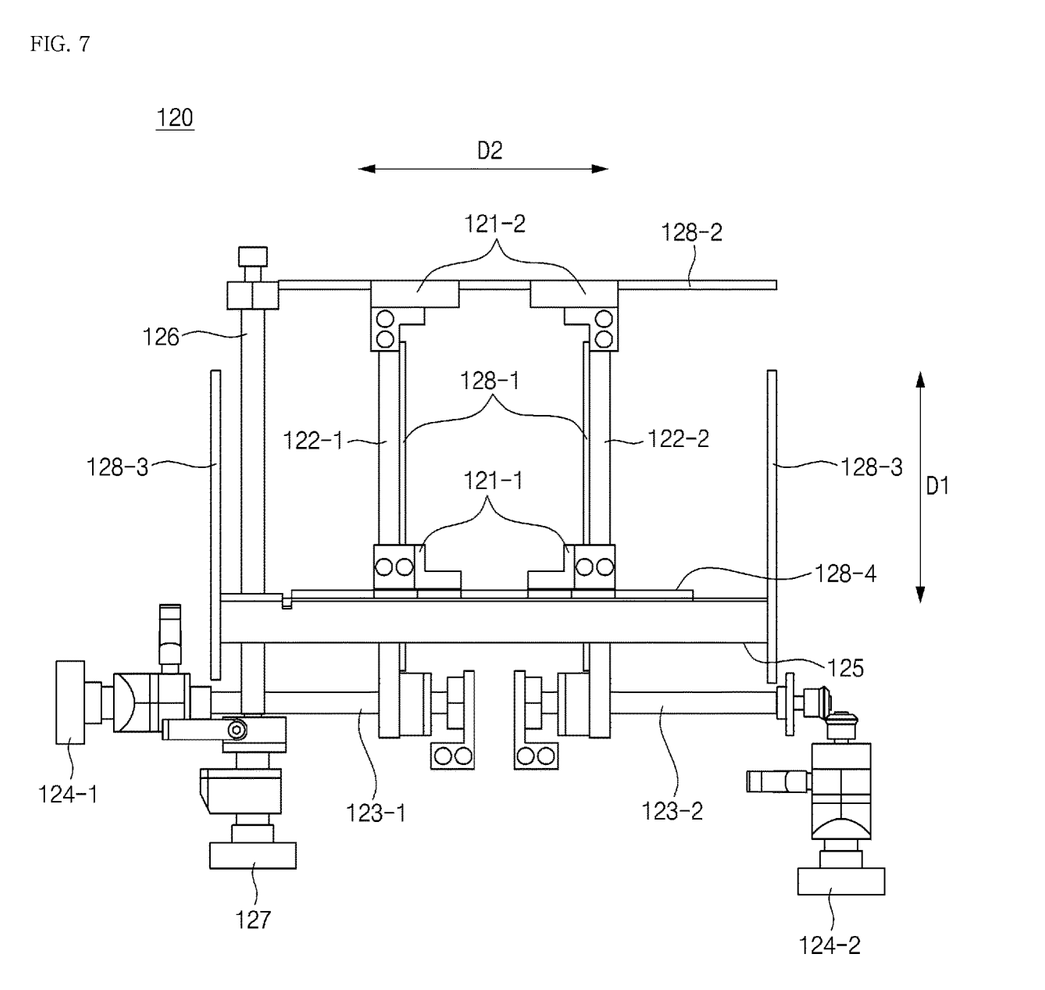
FIG. 7 is a plan view illustrating the variable assembly of the guide hopper according to Embodiment 1 of the present invention.

FIG. 6 is a rear perspective view illustrating the variable assembly 120 of the guide hopper 100 according to Embodiment 1 of the present invention. FIG. 7 is a plan view illustrating the variable assembly 120 of the guide hopper 100 according to Embodiment 1 of the present invention.

Referring to FIGS. 5 to 7, the variable assembly 120 of the guide hopper 100 according to the present invention may further include, in addition to the corner members 121, a full-length adjustment frame 122, a full-length adjustment ball screw 123, the full-length adjustment lever 124, a full-width adjustment frame 125, a full-width adjustment ball screw 126, the full-width adjustment lever 127, a first linear movement guide 128-1, a second linear movement guide 128-2, a third linear movement guide 128-3, and a fourth linear movement guide 128-4. The respective components will be described below in detail.

The full-length adjustment frame 122 may have a length in the first direction D1 and be provided in a pair to be parallel to each other. The corner members 121 described above may be provided on the full-length adjustment frames 122 so as to be disposed in the inner space defined by the pair of full-length adjustment frames 122. Here, the inner space defined by the pair of full-length adjustment frames 122 may mean a space defined between facing side surfaces of the pair of full-length adjustment frames 122.

The pair of full-length adjustment frames 122 may move in the second direction D2 with the corner members 121 provided thereon and accordingly, a distance between the pair of full-length adjustment frames 122 may be adjusted to correspond to the full-length of the radial unit. In addition, since the corner members 121 are provided on the full-length adjustment frames 122 so as to be disposed in the inner space defined by the pair of full-length adjustment frames 122, the dropping of the radical unit may not be interrupted inside the guide space defined by the bent inner sides of the corner members 121 even when the full-length adjustment frames 122 move.

The full-length adjustment frame 122 may have a shape in which one end in a longitudinal direction is bent downward. The downwardly bent portion may be provided with a through-hole through which the full-length adjustment ball screw 123 to be described later passes. Accordingly, movement of the full-length adjustment frames 122 may be controlled.

The corner members 121 may include a pair of first corner members 121-1, each of which is provided at one side in a longitudinal direction of the pair of full-length adjustment frames 122, and a pair of second corner members 121-2, each of which is provided at the other side in the longitudinal direction of the pair of full-length adjustment frames 122. As described above, the variable assembly 120 according to the present invention may be provided with the four corner members 121. Here, the first corner member 121-1 is provided at one side in the longitudinal direction of the full-length adjustment frame 122 so that each of the pair of full-length adjustment frames 122 may be paired with each of the first corner members 121-1 provided at one side in the longitudinal direction of the full-length adjustment frame 122. In addition, the second corner member 121-2 is provided at the other side in the longitudinal direction of the full-length adjustment frame 122 so that each of the pair of full-length adjustment frames 122 may be paired with each of the second corner members 121-2 provided at the other side in the longitudinal direction of the full-length adjustment frame 122.

The full-length adjustment ball screw 123 may pass through the full-length adjustment frame 122 in the second direction D2 to be coupled at one end of the full-length adjustment frame 122 in the longitudinal direction. The full-length adjustment lever 124 may rotate the full-length adjustment ball screw 123 to move the full-length adjustment frame 122 in the second direction D2. That is, when the full-length adjustment ball screw 123 passes through the full-length adjustment frame 122 in the second direction D2 to be coupled, the full-length adjustment frame 122 may move in the second direction D2 by rotation of the full-length adjustment ball screw 123, and the rotation of the full-length adjustment ball screw 123 may be performed through the full-length adjustment lever 124.

The full-length adjustment lever 124 may include a dial display part in which a dial changing by an operation of the full-length adjustment lever 124 is displayed. Here, the dial may indicate the rotation speed of the full-length adjustment lever 124, a distance between the full-length adjustment frames 122, or a distance between the corner members 121 provided in the full-length adjustment frames 122. Accordingly, a user may easily adjust the full-length adjustment frames so as to correspond to the size of the radical unit, and the operability of the full-length adjustment lever 124 may be improved.

The pair of full-length adjustment frames 122 may include a first full-length adjustment frame 122-1, and a second full-length adjustment frame 122-2 provided to be parallel to the first full-length adjustment frame 122-1. The full-length adjustment ball screw 123 may be provided as a single ball screw passing through the first full-length adjustment frame 122-1 and the second full-length adjustment frame 122-2 together, but may include a first full-length adjustment ball screw 123-1, which passes through the first full-length adjustment frame 122-1 to be coupled at one end of the first full-length adjustment frame 122-1 in a longitudinal direction, and a second full-length adjustment ball screw 123-2 which passes through the second full-length adjustment frame 122-2 to be coupled at one end of the second full-length adjustment frame 122-2 in a longitudinal direction. Here, the first full-length adjustment ball screw 123-1 and the second full-length adjustment ball screw 123-2 are spaced apart from each other as illustrated in FIG. 7, and may be independently operated. When the full-length adjustment ball screws 123 are spaced apart from each other to be independently operated, the first full-length adjustment frame 122-1 and the second full-length adjustment frame 122-2 may independently move. Accordingly, the guide space may move in the second direction D2 as a whole so that even when the transfer position of the radical unit slightly changes, the guide space may move to match the transfer position so as to guide the drop of the radical unit.

The full-length adjustment lever 124 may include a first full-length adjustment lever 124-1, which is provided in a longitudinal direction of the first full-length adjustment ball screw 123-1 to rotate the first full-length adjustment ball screw 123-1, and a second full-length adjustment lever 124-2 which is provided in a direction perpendicular to a longitudinal direction of the second full-length adjustment ball screw 123-2 to rotate the second full-length adjustment ball screw 123-2. Here, the second full-length adjustment lever 124-2 may rotate, through bevel gear, the second full-length adjustment ball screw 123-2 disposed at a position perpendicular thereto.

Referring to FIGS. 5 to 7, the variable assembly 120 may further include the full-width adjustment frame 125. The full-width adjustment frame 125 may have a length in the second direction D2 and be provided to be spaced a predetermined distance from the full-length adjustment frame 122. Here, the predetermined distance may mean a distance to the extent that the full-width adjustment frame 125 and the full-length adjustment frame 122 do not interfere with each other during the movement.

In addition, the first corner member 121-1 may have a lower portion mounted on the full-length adjustment frame 122, and an upper portion mounted on the full-width adjustment frame 125. Thus, the pair of first corner members 121-1 may move in the second direction D2 by the full-length adjustment frames 122 and may simultaneously move in the first direction D1 by the full-width adjustment frame 125.

The full-width adjustment frame 125 may be provided in a shape in which both ends in a longitudinal direction are bent downward. In this case, the full-width adjustment ball screw 126 to be described below may pass through one of the bent ends to control movement of the full-width adjustment frame 125, which will be described later.

The variable assembly 120 of the guide hopper 100 according to the present invention may further include the full-width adjustment ball screw 126 and the full-width adjustment lever 127. In detail, the full-width adjustment ball screw 126 may pass through the full-width adjustment frame 125 in the first direction D1 to be coupled at one end of the full-width adjustment frame 125 in a longitudinal direction, and the full-width adjustment lever 127 may rotate the full-width adjustment ball screw 126 to move the full-width adjustment frame 125 in the first direction D1.

The full-width adjustment lever 127 may include a dial display part in which a dial changing by an operation of the full-width adjustment lever 127 is displayed. Here, the dial may indicate the rotation speed of the full-width adjustment lever 127, a distance between the full-width adjustment frame 125 and the housing 110, or a distance between the first corner member 121-1 and the second corner member 121-2. Accordingly, the user may easily adjust the full-width adjustment lever 127 to correspond to the size of the radical unit so as to improve the operability of the full-width adjustment lever 127.

The variable assembly 120 according to the present invention may include the first linear movement guide 128-1, the second linear movement guide 128-2, the third linear movement guide 128-3, and the fourth linear movement guide 128-4 so as to guide linear movement of the corner members 121 or the full-width adjustment frame 125.

A pair of first linear movement guides 128-1 may be provided on facing side surfaces of the pair of full-length adjustment frames 122 so as to guide first direction D1 movement of the first corner members 121-1. That is, the first corner member 121-1 may be provided on the full-length adjustment frame 122, and in detail, may be linearly movably mounted on the first linear movement guide 128-1 provided in the full-length adjustment frame 122. Accordingly, the first corner member 121-1 may linearly move in the first direction D1 parallel to the longitudinal direction of the full-length adjustment frame 122.

The second linear movement guide 128-2 may be provided in the housing 110 and guide second direction D2 movement of the second corner members 121-2. Specifically, the second linear movement guide 128-2 may be provided to have a length in the second direction D2 inside the housing 110. The second corner member 121-2 may be fixed to the full-length adjustment frame 122 on a lower portion thereof and also linearly movably mounted on the second linear movement guide 128-2 on a side surface thereof. Accordingly, the second corner member 121-2 may linearly move in the second direction D2 according to second direction D2 movement of the full-length adjustment frame 122.

A pair of third linear movement guide 128-3 may be provided in the housing 110 and guide first direction D1 movement of the full-width adjustment frame 125. In detail, the third linear movement guide 128-3 may be provided to have a length in the first direction D1 inside the housing 110, and may be provided in a pair inside the housing 110 to face each other. The full-width adjustment frame 125 may be linearly movably mounted on the third linear movement guide 128-3 on a side surface thereof. In detail, the full-width adjustment frame 125 may be linearly movably mounted on the third linear movement guides 128-3 on side surfaces bent downward from the both ends in the longitudinal direction. Accordingly, the full-width adjustment frame 125 may linearly move in the first direction D1.

The fourth linear movement guide 128-4 may be provided in the full-width adjustment frame 125 and guide second direction D2 movement of the first corner members 121-1. In detail, the fourth linear movement guide 128-4 may be provided to have a length in the second direction D2 in the full-width adjustment frame 125. The first corner member 121-1 may be mounted on a lower portion thereof so as to be linearly movable by the first linear movement guides 128-1 of the full-length adjustment frames 122, and also mounted on the fourth linear movement guide 128-4 on an upper portion thereof so as to be linearly movable in the second direction D2. That is, the first corner member 121-1 may move in the first direction D1 by the full-length adjustment frame 122 or move in the second direction D2 by the full-width adjustment frame 125. Here, the linear movement may be guided by the first linear movement guide 128-1 or the fourth linear movement guide 128-4.

Figure 8:
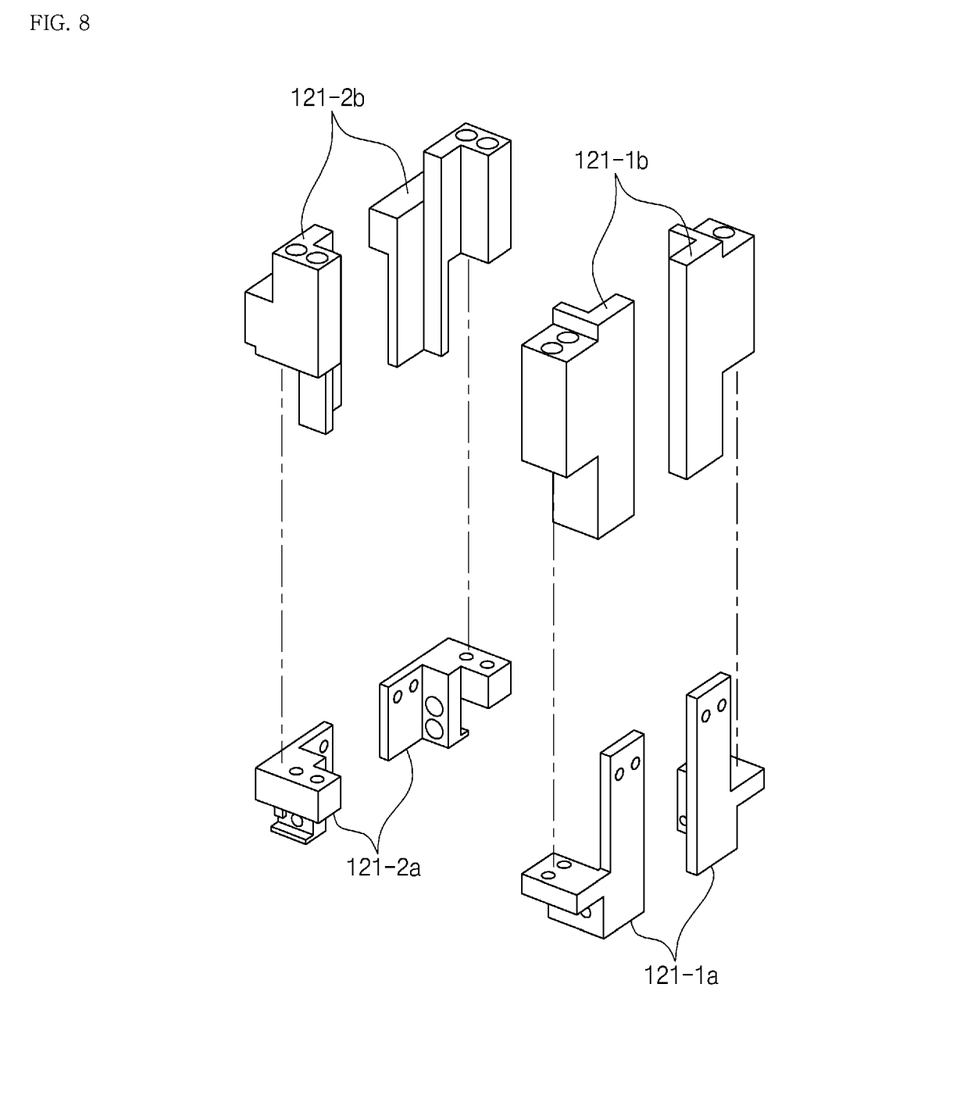
FIG. 8 is an exploded perspective view illustrating a corner member of the guide hopper according to Embodiment 1 of the present invention.

FIG. 8 is an exploded perspective view illustrating the corner member 121 of the guide hopper 100 according to Embodiment 1 of the present invention. As illustrated in FIGS. 7 and 8, the first corner member 121-1 may include a first bracket 121-1a, which is mounted on the first linear movement guide 128-1 and the fourth linear movement guide 128-4, and a first guide block 121-1b provided in the first bracket 121-1a. The second corner member 121-2 may include a second bracket 121-2a, which is mounted on the second linear movement guide 128-2 and the full-length adjustment frame 122, and a second guide block 121-2b provided in the second bracket 121-2a.

Referring to FIGS. 2 and 3, the guide hopper 100 according to the present invention may further include a roller 130, and the roller 130 may be provided on an upper portion at one side of the housing 110 so as to have a length in the second direction D2. Here, the roller 130 may provide power so that the radical unit transferred from the outside of the guide hopper 100 is movable into the inner space defined the housing 110. In addition, since the roller 130 is provided in the second direction D2 and rotates in the first direction D1, the second direction D2, which is a longitudinal direction of the roller 130, may be perpendicular to the transfer direction of the radical unit, and the first direction D1 may be parallel to the transfer direction of the radical unit.

The roller 130 may be provided to be slidably attachable and detachable in the second direction D2. That is, since the first direction D1 is a rotation direction of the roller 130 and a direction in which the radical unit is transferred, the roller 130 may be slidably attachable and detachable in the second direction D2 perpendicular to the first direction D1 so as to prevent the roller 130 from being arbitrarily separated during operation.

Embodiment 2

Figure 9:
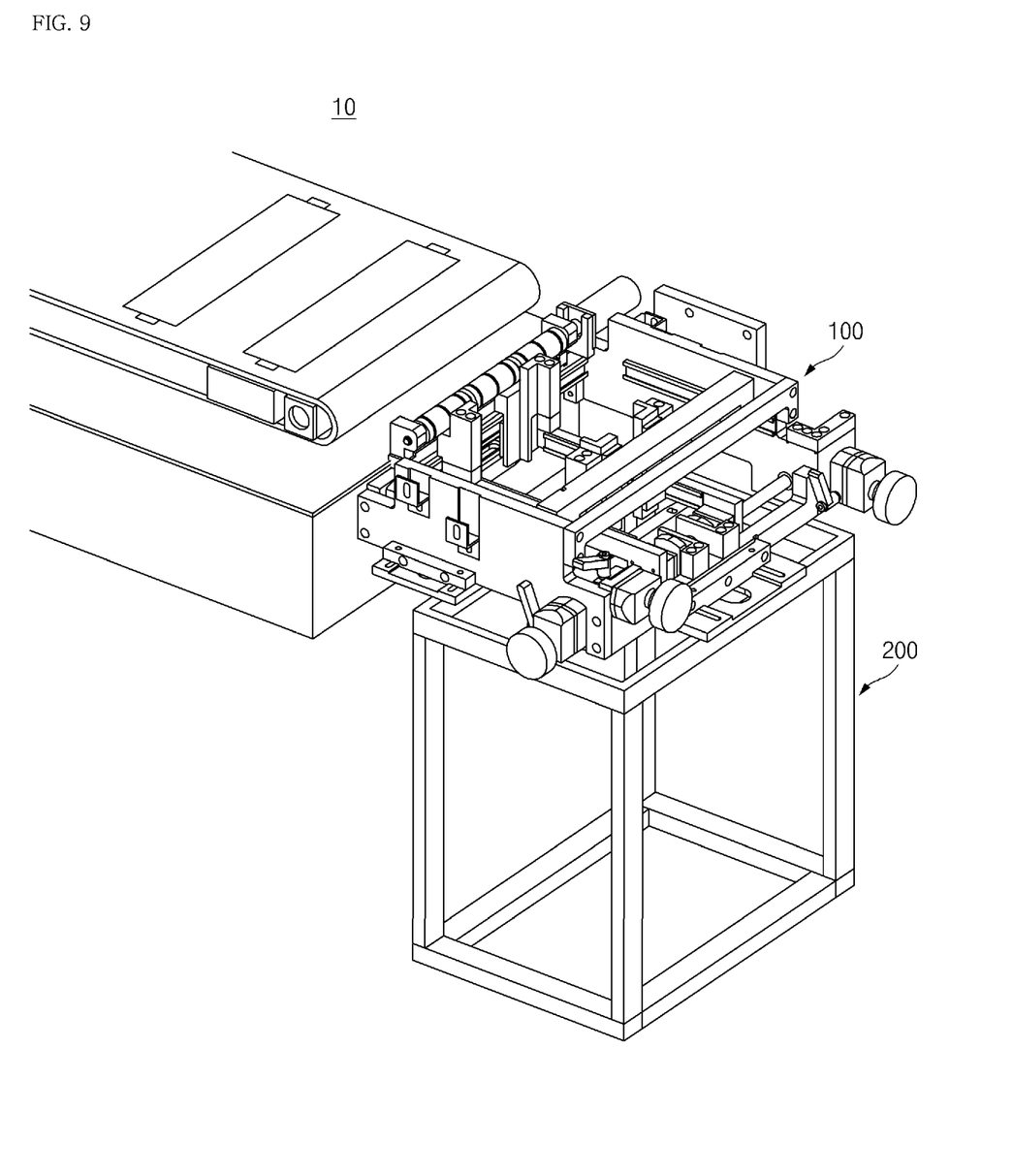
FIG. 9 is a perspective view illustrating an apparatus for manufacturing a secondary battery according to Embodiment 2 of the present invention.

FIG. 9 is a perspective view illustrating an apparatus for manufacturing a secondary battery according to Embodiment 2 of the present invention. Embodiment 2 of the present invention is different from Embodiment 1 in terms of an apparatus for manufacturing a secondary battery including the guide hopper 100 of Embodiment 1.

The content in common with Embodiment 1 will be preferably omitted and the description of Embodiment 2 will be focused on differences. That is, it is apparent that the content that is not described in Embodiment 2 may be regarded as the content of Embodiment 1 if necessary.

Referring to FIG. 9, an apparatus 10 for manufacturing a secondary battery according to Embodiment 2 of the present invention includes a magazine 200 and a guide hopper 100. A radical unit is dropped and loaded into the magazine 200, and the guide hopper 100 is provided above the magazine 200 and guides the dropping of the radical unit.

Referring to FIG. 2, the guide hopper 100 according to the present invention includes a housing 110, in which an inner space having upper and lower portions opened is defined, and a variable assembly 120 disposed in the inner space of the housing 110. The variable assembly 120 includes four corner members of which bent inner sides define a guide space having a rectangular parallelepiped shape. The size of the guide space is adjustable by movement of the corner members in a first direction D1 or in a second direction D2 perpendicular to the first direction D1. Accordingly, in the apparatus 10 for manufacturing a secondary battery according to the present invention, when the full-length or full-width of the radical unit changes, non-operating losses due to replacement of the guide hopper 100 may be reduced to enhance process and cost efficiency.

In the apparatus 10 for manufacturing a secondary battery according to Embodiment 2 of the present invention, the other detailed configuration of the guide hopper 100 and the resultant effects would be understood as the same as those of Embodiment 1.

The guide hopper according to the present invention and the apparatus for manufacturing a secondary battery including the same may include the housing, in which the inner space having the upper and lower portions opened is defined, and the variable assembly disposed in the inner space of the housing. The variable assembly may include the four corner members of which the bent inner sides define the guide space having the rectangular parallelepiped shape. The size of the guide space may be adjustable by the movement of the corner members in the first direction or in the second direction perpendicular to the first direction. Accordingly, when the full-length or full-width of the radical unit changes, the non-operating losses due to the replacement of the guide hopper may be reduced to enhance the process and cost efficiency.

While the present invention has been shown and described in connection with the exemplary embodiments and drawings, it will be apparent to those skilled in the art that modifications and variations can be made without departing from the spirit and scope of the invention as defined by the appended claims.

DESCRIPTION OF THE SYMBOLS

10: Apparatus
100: Guide hopper
110: Housing
120: Variable assembly
121: Corner members
121-1: First corner member
121-1a: First bracket
121-1b: First guide block
121-2: Second corner member
121-2a: Second bracket
121-2b: Second guide block
122: Full-length adjustment frames
122-1: First full-length adjustment frame
122-2: Second full-length adjustment frame
123: Full-length adjustment ball screws
123-1: First full-length adjustment ball screw
123-2: Second full-length adjustment ball screw
124: Full-length adjustment lever
124-1: First full-length adjustment lever
124-2: Second full-length adjustment lever
125: Full-width adjustment frame
126: Full-width adjustment ball screw
127: Full-width adjustment lever
128-1: First linear movement guide
128-2: Second linear movement guide
128-3: Third linear movement guide
128-4: Fourth linear movement guide
130: Roller
200: Magazine
D1: First direction
D2: Second direction

What is claimed is:

1. A guide hopper comprising:
a housing in which an inner space having an upper portion and a lower portion is defined; and
a variable assembly disposed in the inner space of the housing,
wherein the variable assembly comprises:
a first full-length adjustment frame and a second full-length adjustment frame, each of which has a length in a first direction, the length in the first direction of each of the first and second full-length adjustment frames being configured to be parallel to each other; and
four corner members which define a guide space having a rectangular shape, the four corner members being positioned on the first full-length adjustment frame and the second full-length adjustment frame so as to be disposed in the inner space defined by the full-length adjustment frames, wherein the corner members comprise:
a pair of first corner members, each of which is positioned at a respective first end of the first and second full-length adjustment frames; and
a pair of second corner members, each of which is positioned at a second end of the full-length adjustment frames,
wherein the guide space is adjustable by movement of the corner members in the first direction or in a second direction perpendicular to the first direction.

2. The guide hopper of claim 1, wherein the housing has four side surfaces along which a plurality of side frames are connected to each other to define the inner space.

3. The guide hopper of claim 1, wherein the first full-length adjustment frame and the second full-length adjustment frame each have a shape in which one end in a longitudinal direction is bent downward.

4. The guide hopper of claim 1, wherein the variable assembly further comprises:
a ball screw extending through the first and second full-length adjustment frames in the second direction and coupled at one of the first and second ends; and
a lever configured to rotate the ball screw along the first and second full-length adjustment frames in the second direction.

5. The guide hopper of claim 4, wherein the lever comprises a dial display which is configured to change by an operation of the lever.

6. The guide hopper of claim 4, wherein:
a first full-length adjustment ball screw extending through the first full-length adjustment frame and coupled to the first full-length adjustment frame, and
a second full-length adjustment ball screw passing through the second full-length adjustment frame to be coupled at one end of the second full-length adjustment.

7. The guide hopper of claim 6, wherein the lever comprises:
a first full-length adjustment lever positioned in a longitudinal direction of the first full-length adjustment ball screw and configured to rotate the first full-length adjustment ball screw; and
a second full-length adjustment lever positioned in a direction perpendicular to a longitudinal direction of the second full-length adjustment ball screw and configured to rotate the second full-length adjustment ball screw.

8. The guide hopper of claim 1, wherein:
the variable assembly further comprises a full-width adjustment frame having a length in the second direction and positioned at a predetermined distance from the first and second full-length adjustment frames; and
each of the first corner member has a lower portion mounted on a respective one of the first and second full-length adjustment frames, and an upper portion mounted on the full-width adjustment frame.

9. The guide hopper of claim 8, wherein the full-width adjustment frame has a shape in which opposing ends of the full-width adjustment frame are bent downward.

10. The guide hopper of claim 8, wherein the variable assembly further comprises:
a full-width adjustment ball screw passing through the full-width adjustment frame in the first direction and coupled to the full-width adjustment frame; and
a full-width adjustment lever configured to move the full-width adjustment frame in the first direction by rotating the full-width adjustment ball screw.

11. The guide hopper of claim 10, wherein the full-width adjustment lever comprises a dial display which is configured to change by an operation of the full-width adjustment lever.

12. The guide hopper of claim 8, wherein the variable assembly further comprises:
- a pair of first linear movement guides positioned along an interior side of a respective one of the first and second full-length adjustment frames and configured to guide movement of a respective one of the first corner members in the first direction;
- a second linear movement guide positioned perpendicular to the first and second full-length adjustment frames and configured to guide movement of a respective one of the second corner members in the second direction;
- a pair of third linear movement guides positioned parallel to the first and second full-length adjustment frames and configured to guide movement of the full-width adjustment frame in the first direction; and
- a fourth linear movement guide positioned along the full-width adjustment frame and configured to guide movement of the first corner members in the second direction.

13. The guide hopper of claim 12, wherein:
each of the first corner member comprises:
- a first bracket mounted on the fourth linear movement guide and each of the first linear movement guides, and
- a first guide block provided on the first bracket; and each of the second corner member comprises:
- a second bracket mounted on the second linear movement guide and the full-length adjustment frame, and
- a second guide block provided on the second bracket.

14. The guide hopper of claim 1, further comprising a roller positioned on an upper portion of one side of the housing so as to have a length in the second direction.

15. The guide hopper of claim 14, wherein the roller is provided to be slidably attachable and detachable in the second direction.

16. An apparatus for manufacturing a secondary battery comprising:
- a magazine configured to receive a radical unit dropped and loaded therein; and
- the guide hopper of claim 1 is positioned above the magazine and configured to guide the dropping of the radical unit.

17. A guide hopper comprising:
- a housing in which an inner space having an upper portion and a lower portion is defined; and
- a variable assembly disposed in the inner space of the housing, wherein the variable assembly comprises:
- a first full-length adjustment frame and a second full-length adjustment frame, each of which has a length in a first direction, the length in the first direction of each of the first and second full-length adjustment frames being configured to be parallel to each other; and
- four corner members which define a guide space having a rectangular shape, the four corner members being positioned on the first full-length adjustment frame and the second full-length adjustment frame so as to be disposed in the inner space defined by the full-length adjustment frames, wherein the guide space is adjustable by movement of the corner members in the first direction or in a second direction perpendicular to the first direction, and wherein the first full-length adjustment frame and the second full-length adjustment frame each have a shape in which one end in a longitudinal direction is bent downward.

18. An apparatus for manufacturing a secondary battery comprising:
- a magazine configured to receive a radical unit dropped and loaded therein; and
- the guide hopper of claim 17 is positioned above the magazine and configured to guide the dropping of the radical unit.

* * * * *